US00RE46578E

(19) United States
(12) Reissued Patent
Collins

(10) Patent Number: US RE46,578 E
(45) Date of Reissued Patent: Oct. 24, 2017

(54) ENCLOSURE FOR A PERITONEAL DIALYSIS DEVICE

(71) Applicant: DEKA Products Limited Partnership, Manchester, NH (US)

(72) Inventor: David E. Collins, Manchester, NH (US)

(73) Assignee: DEKA Products Limited Partnership, Manchester, NH (US)

(21) Appl. No.: 29/579,836

(22) Filed: Oct. 4, 2016

Related U.S. Patent Documents

Reissue of:
(64) Patent No.: Des. 724,741
Issued: Mar. 17, 2015
Appl. No.: 29/493,113
Filed: Jun. 5, 2014

(51) LOC (10) Cl. ..... 24-01
(52) U.S. Cl.
USPC ..... D24/169
(58) Field of Classification Search
USPC ..... D24/169, 186, 107, 108, 216, 219, 232
CPC ..... A61M 1/284; A61M 1/282; A61M 2209/084; A61M 2205/128
See application file for complete search history.

(56) References Cited

U.S. PATENT DOCUMENTS

D308,249 S * 5/1990 Buckley ..... D24/169
D341,890 S 11/1993 Sievert et al.
5,350,357 A * 9/1994 Kamen ..... A61M 1/28 604/29
D351,470 S * 10/1994 Scherer et al. ..... D24/169
5,431,626 A * 7/1995 Bryant et al. ..... 604/65
5,628,908 A 5/1997 Kamen et al.
D386,634 S 11/1997 Daugs
(Continued)

OTHER PUBLICATIONS

Ing et al., editors. Dialysis: History, Development, and Promise. Hackensack, NJ: World Scientific, 2012. 259-269.
(Continued)

*Primary Examiner* — Phillip S Hyder
(74) *Attorney, Agent, or Firm* — Wolf, Greenfield & Sacks, P.C.

(57) CLAIM

The ornamental design for [a] *an* enclosure [skirt] for a peritoneal dialysis device, as shown and described.

DESCRIPTION

FIG. 1 is a front, top, and right side perspective view of the enclosure [skirt] for a peritoneal dialysis device, showing the new design;
FIG. 2 is a front side elevational view thereof;
FIG. 3 is a rear side elevational view thereof;
FIG. 4 is a right side elevational view thereof[.]*;*
FIG. 5 is a left side elevational view thereof; [and]
FIG. 6 is a top plan view thereof; and,
FIG. 7 is a bottom plan view thereof.
The broken lines *immediately adjacent the shaded areas* represent [unclaimed portions of the enclosure skirt for a peritoneal dialysis device and] *the bounds of the claimed design while all other broken lines are directed to environment and are for illustrative purposes only; the broken lines* form no part of the claimed design.

1 Claim, 6 Drawing Sheets

Figure 6:
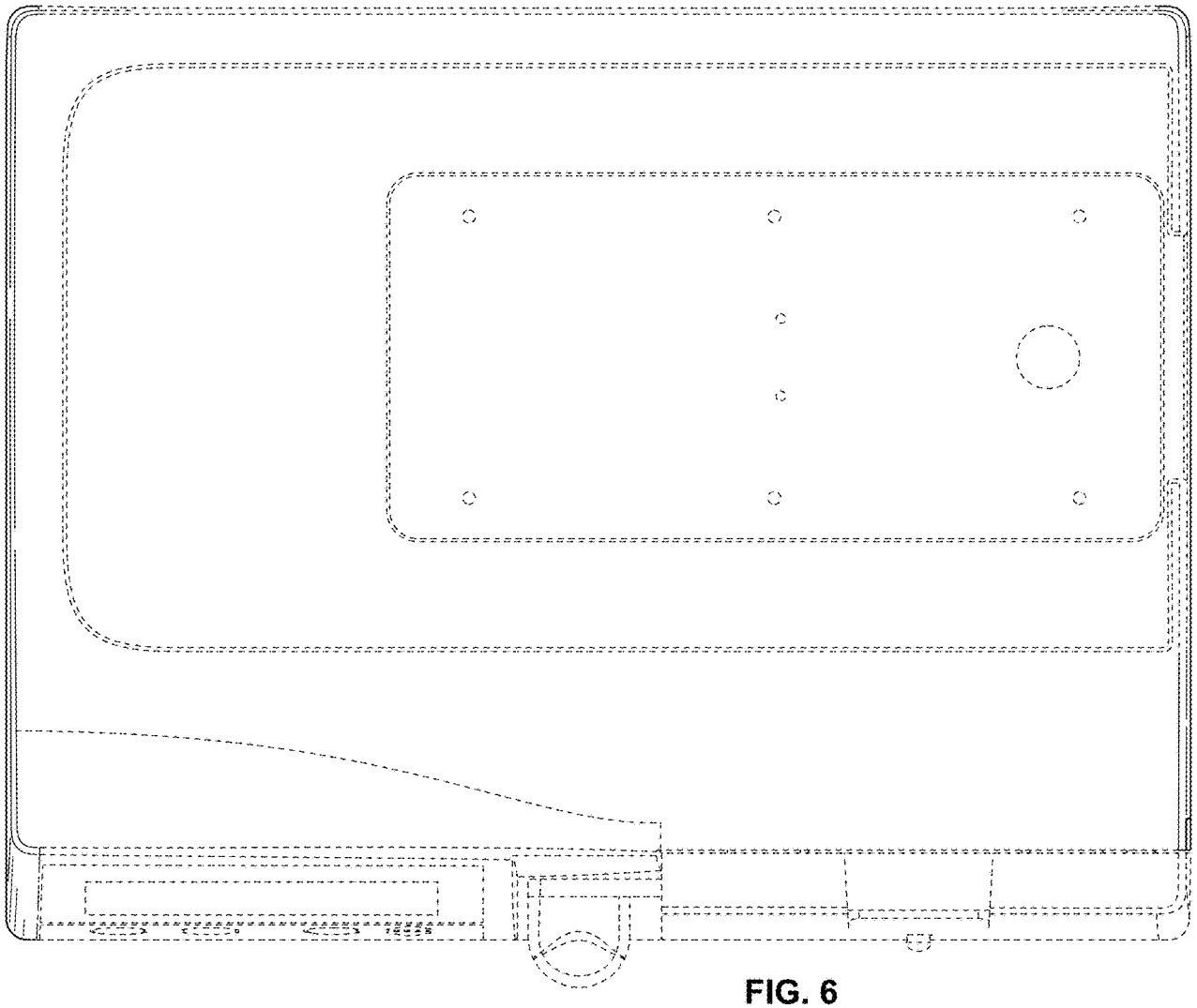

Matter enclosed in heavy brackets [ ] appears in the original patent but forms no part of this reissue; matter printed in italics indicates the additions made by reissue.

(AMENDED)

(56) References Cited

U.S. PATENT DOCUMENTS

| | | | | |
|---|---|---|---|---|
| D393,314 | S | 4/1998 | Meisner et al. | |
| 5,938,634 | A * | 8/1999 | Packard | 604/29 |
| D483,206 | S | 12/2003 | Schweikarth | |
| D534,275 | S | 12/2006 | Hayamizu | |
| D556,910 | S * | 12/2007 | Reihanifam et al. | D24/169 |
| D565,157 | S | 3/2008 | Bates | |
| D565,178 | S | 3/2008 | Tanaka | |
| D596,719 | S | 7/2009 | Chen | |
| D609,350 | S | 2/2010 | Hickey et al. | |
| D627,470 | S | 11/2010 | Hickey et al. | |
| D637,293 | S * | 5/2011 | Hickey et al. | D24/169 |
| D639,930 | S | 6/2011 | Collins et al. | |
| D641,882 | S | 7/2011 | Hickey et al. | |
| D645,157 | S * | 9/2011 | Fallon et al. | D24/227 |
| D663,844 | S | 7/2012 | McGill et al. | |
| D675,727 | S | 2/2013 | Collins et al. | |
| D680,849 | S | 4/2013 | Berger et al. | |
| 8,512,553 | B2 | 8/2013 | Cicchello et al. | |
| 8,720,913 | B2 * | 5/2014 | Fallon | B62B 3/02 280/47.35 |
| D724,740 | S | 3/2015 | Collins et al. | |
| D724,741 | S | 3/2015 | Collins | |
| D724,742 | S | 3/2015 | Johnson | |
| D725,277 | S | 3/2015 | Gill | |
| D725,780 | S | 3/2015 | Johnson | |
| D725,781 | S | 3/2015 | Collins | |
| D725,782 | S | 3/2015 | Gill | |
| D745,646 | S | 12/2015 | Schonherr et al. | |
| D748,229 | S | 1/2016 | Yoshioka | |
| D750,764 | S | 3/2016 | DeSocio | |
| D755,394 | S | 5/2016 | Collins et al. | |
| D755,975 | S | 5/2016 | Collins et al. | |
| D757,272 | S | 5/2016 | Distler et al. | |
| 2004/0156745 | A1 * | 8/2004 | Vandlik | A61M 1/0209 422/44 |
| 2004/0202561 | A1 | 10/2004 | Hershberger et al. | |
| 2008/0015490 | A1 | 1/2008 | Hershberger et al. | |
| 2009/0113335 | A1 | 4/2009 | Sandoe et al. | |
| 2009/0222119 | A1 * | 9/2009 | Plahey et al. | 604/29 |
| 2010/0087777 | A1 * | 4/2010 | Hopping | A61M 1/28 604/29 |
| 2013/0037142 | A1 * | 2/2013 | Farrell | 134/565.01 |
| 2014/0018728 | A1 * | 1/2014 | Plahey et al. | 604/29 |

OTHER PUBLICATIONS

Baxter Healthcare Corporation. HomeChoice: HomeChoice PRO APD Systems Patient At-Home Guide. N.p.: Baxter Healthcare Corporation, Oct. 12, 2009: i, sect.-p. 5-8, 5-10, 20-3, 20-5, 20-19.
Photographs of HomeChoice Automated Peritoneal Dialysis System cycler, Baxter Healthcare Corporation.
Photographs of HomeChoice PRO Automated Peritoneal Dialysis System cycler, Baxter Healthcare Corporation.

* cited by examiner

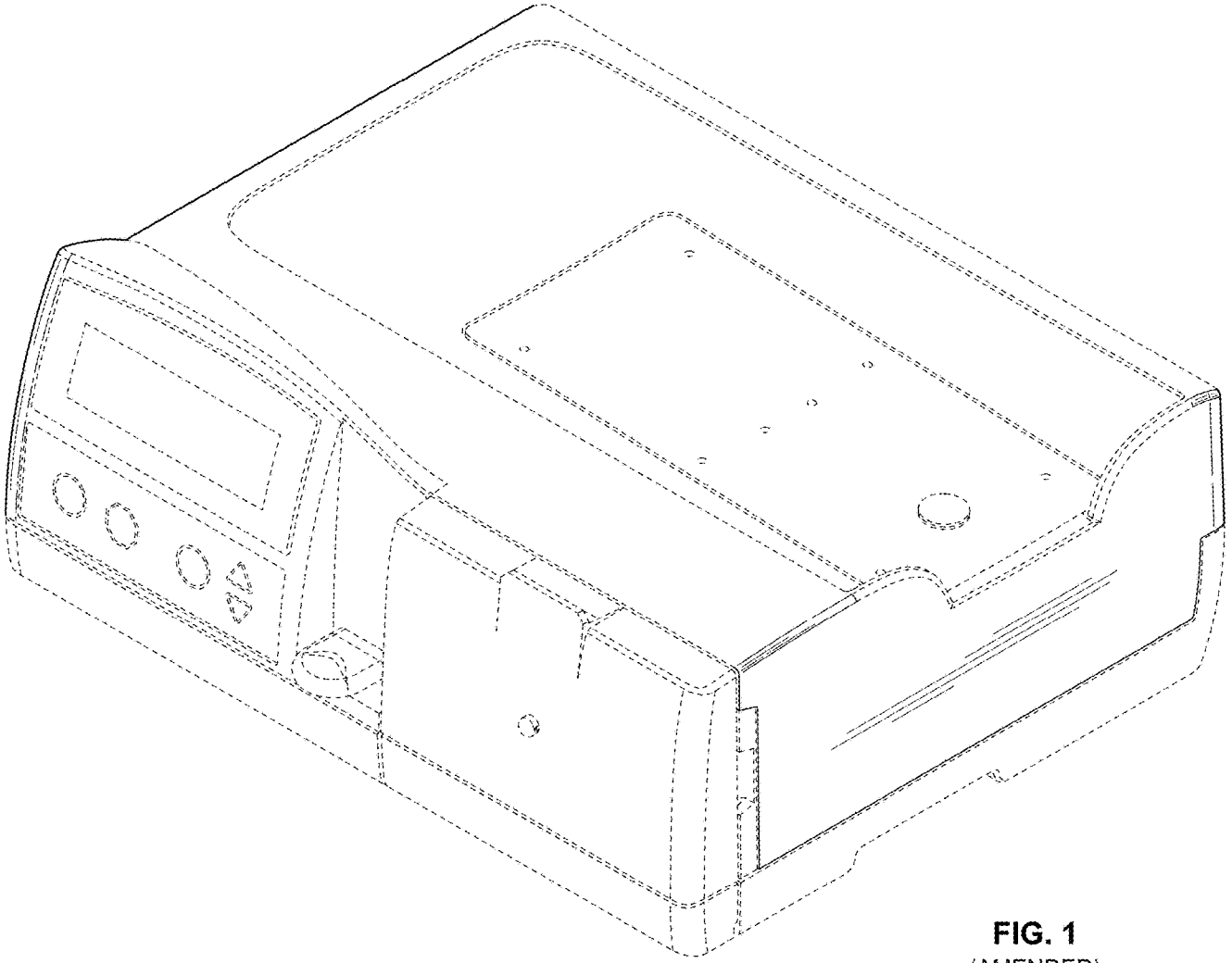
FIG. 1
(AMENDED)

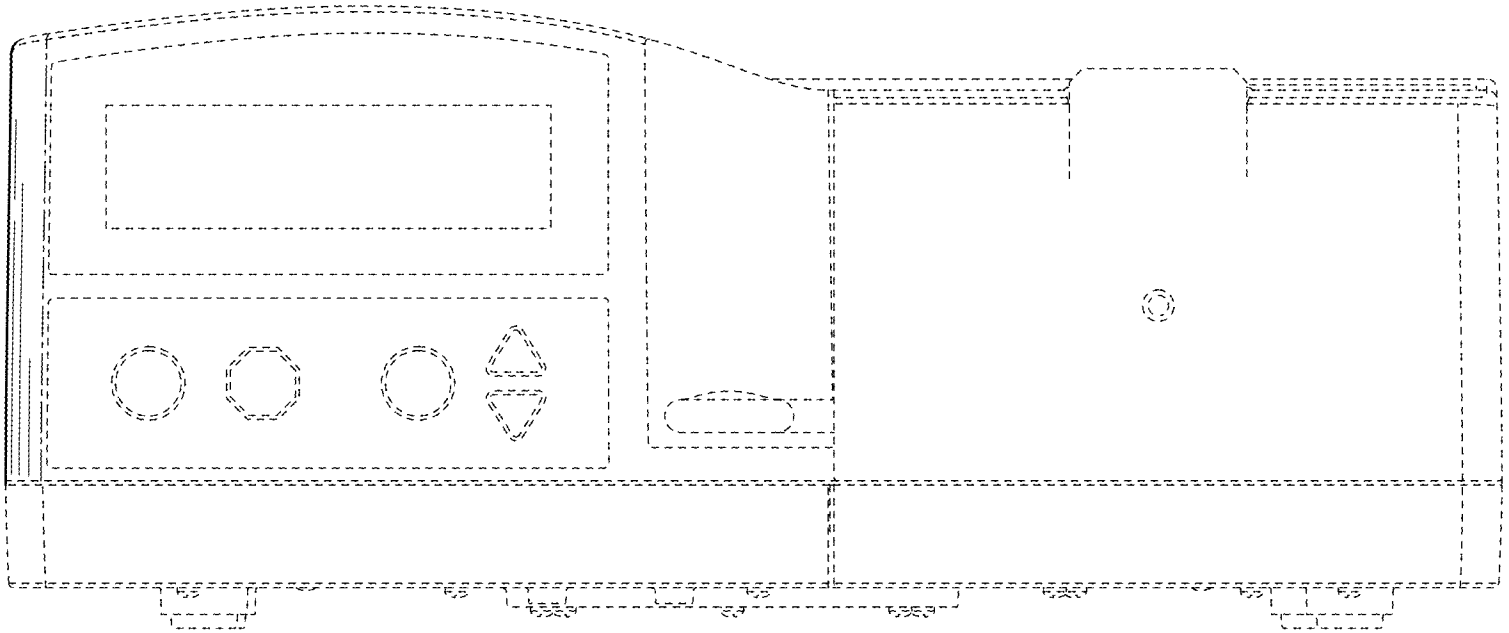
FIG. 2
(AMENDED)

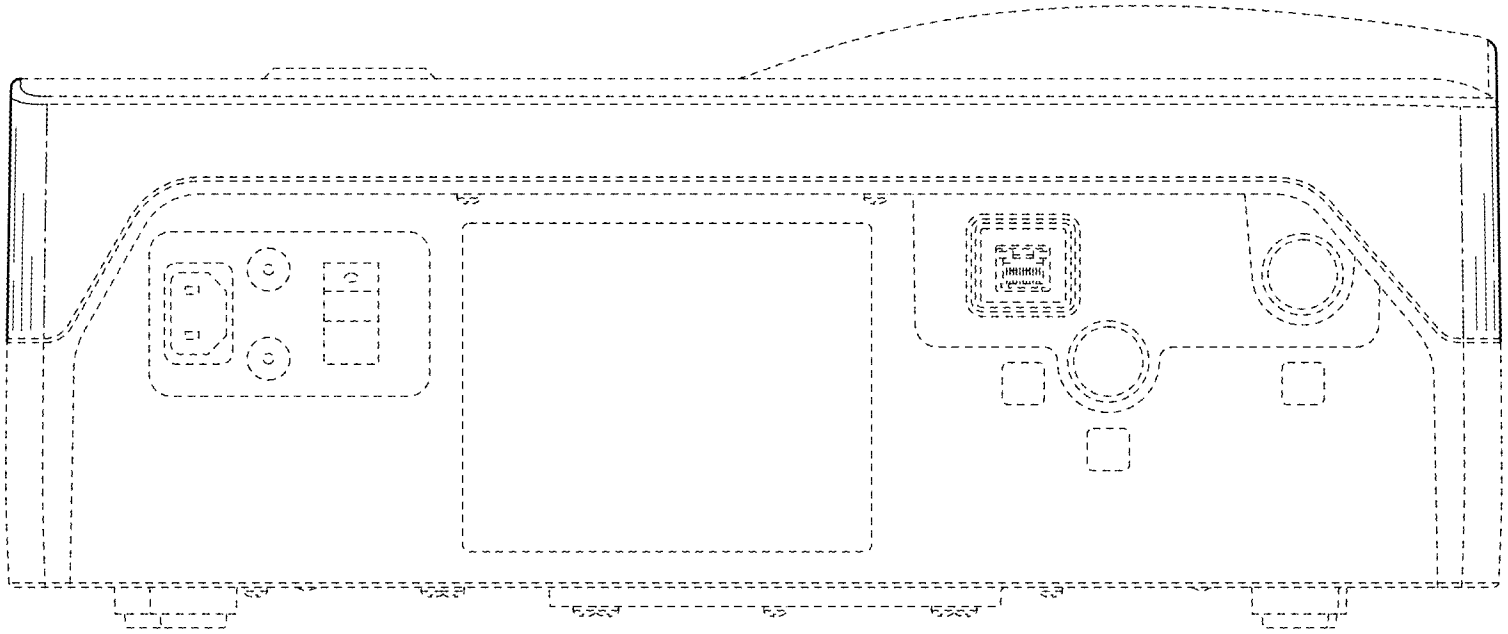
FIG. 3
(AMENDED)

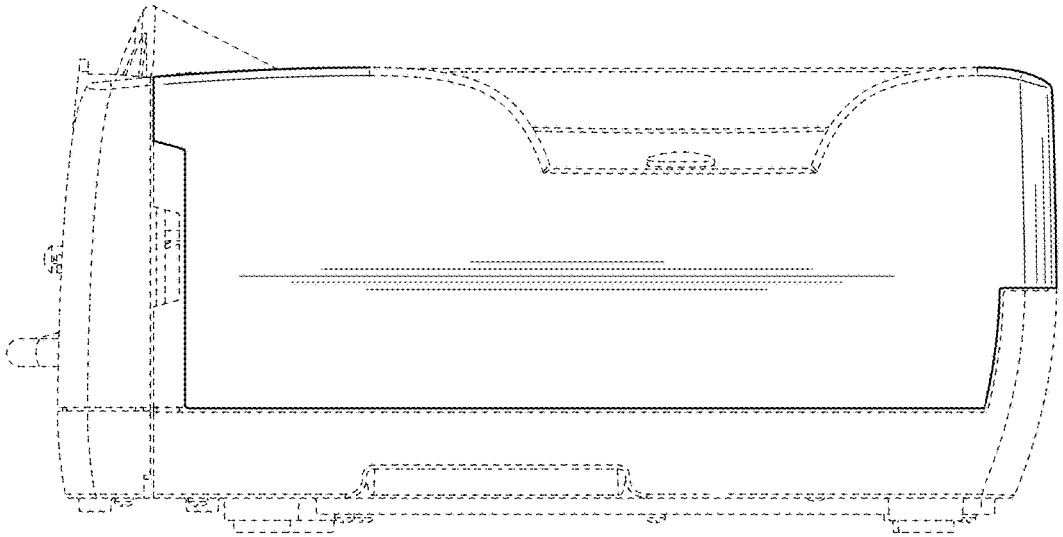
FIG. 4
(AMENDED)
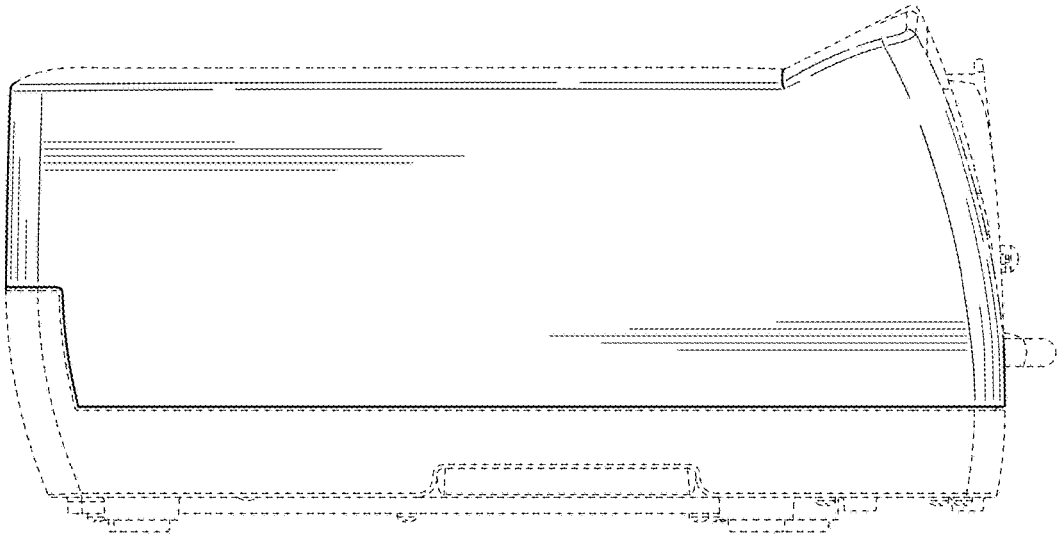
FIG. 5
(AMENDED)

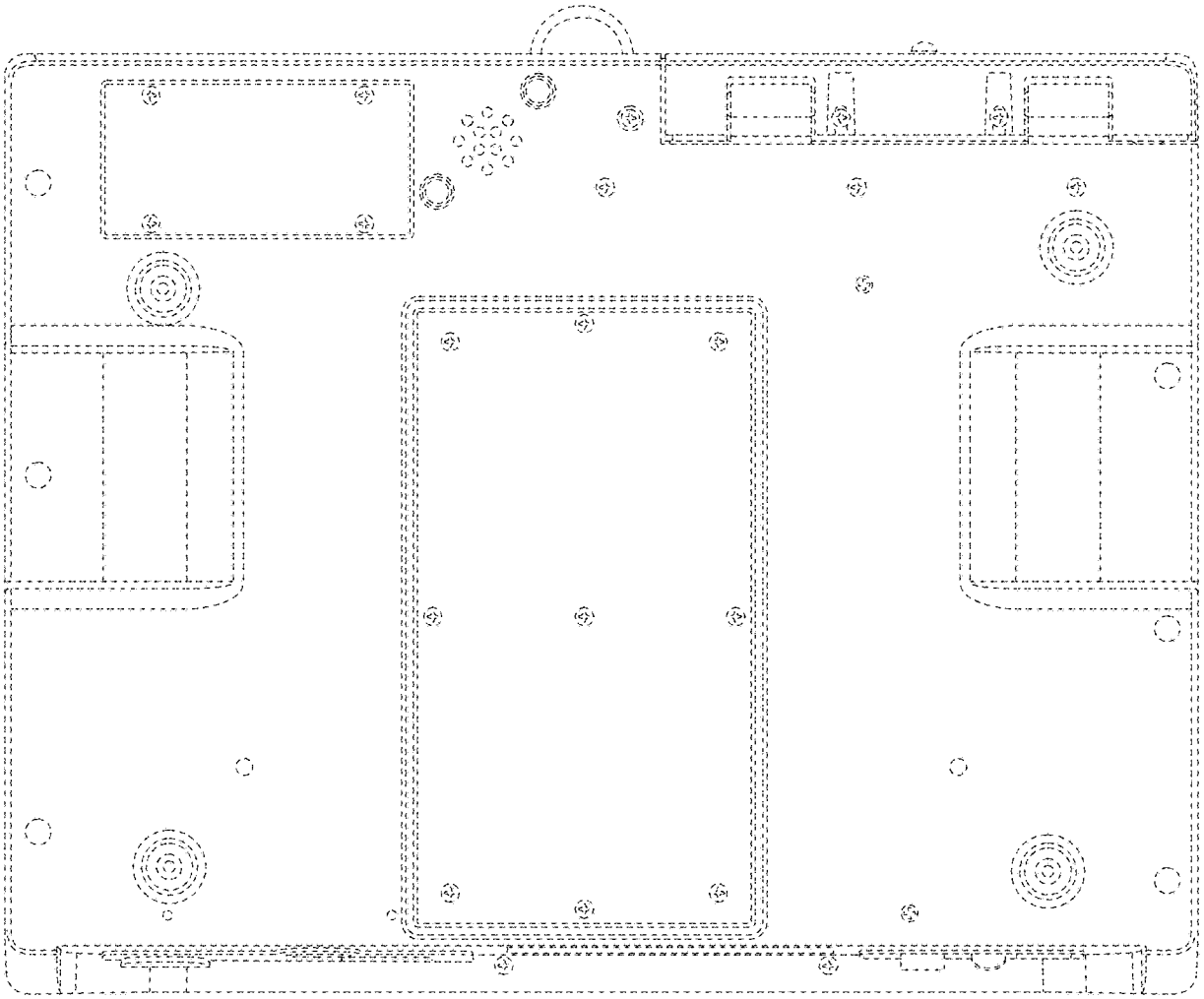
FIG. 7
(AMENDED)